United States Patent
Camenisch et al.

(10) Patent No.: US 10,640,273 B2
(45) Date of Patent: May 5, 2020

(54) AUTHENTICATION OF PACKAGED PRODUCTS

(71) Applicant: International Business Machines Corporation, Armonk, NY (US)

(72) Inventors: Jan L. Camenisch, Thalwil (CH); Emmanuel Delamarche, Thalwil (CH); Eduarda Freire Stögbuchner, Unterhaching (DE); Onur Gökçe, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/991,552

(22) Filed: May 29, 2018

(65) Prior Publication Data
US 2019/0367239 A1     Dec. 5, 2019

(51) Int. Cl.
*G06F 17/00* (2019.01)
*B65D 79/02* (2006.01)
(Continued)

(52) U.S. Cl.
CPC ......... *B65D 79/02* (2013.01); *G06K 7/10861* (2013.01); *G06K 19/06037* (2013.01); *H04L 9/0897* (2013.01)

(58) Field of Classification Search
CPC ...... G07C 9/00309; G07C 2009/00404; G07C 2009/00412; G07C 2009/00825; G07C 9/00571; H04L 63/0428; H04L 2209/80; H04L 63/068; H04L 63/0876; H04L 63/10; G06F 2211/007; G06Q 30/018; G06Q 30/04; G06Q 30/06
See application file for complete search history.

(56) References Cited

U.S. PATENT DOCUMENTS 4,864,494 A * 9/1989 Kobus, Jr. .............. G06F 21/125
726/33
8,185,744 B2   5/2012 Brown et al.
(Continued)

FOREIGN PATENT DOCUMENTS

WO     2017027648 A1     2/2017

OTHER PUBLICATIONS

Camenisch et al., "Authentication in Distribution Systems," U.S. Appl. No. 15/991,574, filed May 29, 2018.
EPCglobal, "Pedigree Ratified Standard," Version 1.0, Jan. 2007, https://www.gs1.org/sites/default/files/docs/epc/pedigree_1_0-standard-20070105.pdf (retrieved May 3, 2018), 138 pages.
Keni, Harshith R., "Product Authentication Using Hash Chains and Printed QR Codes," Diss. South Dakota State University, 2016, 58 pages.
(Continued)

*Primary Examiner* — Thien M Le
(74) *Attorney, Agent, or Firm* — Cantor Colburn LLP; Daniel Morris (57) ABSTRACT

Methods are provided for producing an authenticated packaged product. The method includes providing on the product a security code encoding security data for the product, packing the product in packaging, and providing a tag carrying encrypted product data on the packaging. The product data comprises the security data for the product. The method further comprises storing a decryption key for the encrypted product data at a network server, and providing on the packaging access data for accessing the decryption key at the network server. Corresponding methods and systems are provided for verifying authenticity of such an authenticated packaged product.

15 Claims, 5 Drawing Sheets

(51) Int. Cl.
*H04L 9/08* (2006.01)
*G06K 7/10* (2006.01)
*G06K 19/06* (2006.01)

(56) References Cited

U.S. PATENT DOCUMENTS

| | | | |
|---|---|---|---|
| 8,660,914 B2 | 2/2014 | Soppera et al. | |
| 9,070,131 B2 | 6/2015 | Feldman | |
| 9,306,750 B2 | 4/2016 | Syngkon et al. | |
| 2003/0014635 A1* | 1/2003 | Laforge | G06Q 30/04 713/176 |
| 2004/0139318 A1* | 7/2004 | Fiala | G06Q 20/3558 713/165 |
| 2006/0180661 A1* | 8/2006 | Grant | G06Q 30/06 235/382 |
| 2009/0222285 A1 | 9/2009 | Silverbrook et al. | |
| 2013/0159712 A1 | 6/2013 | Sigworth et al. | |
| 2016/0036788 A1* | 2/2016 | Conrad | G07C 9/00571 713/168 |
| 2016/0036814 A1* | 2/2016 | Conrad | H04L 63/0876 713/171 |
| 2017/0006027 A1* | 1/2017 | Hagiwara | G06Q 30/02 |
| 2017/0032382 A1 | 2/2017 | Shulman et al. | |
| 2017/0053339 A1* | 2/2017 | Khan | G06Q 30/06 |
| 2017/0350821 A1 | 12/2017 | Delamarche et al. | |

OTHER PUBLICATIONS

List of IBM Patents or Patent Applications Treated As Related; Date Filed: May 29, 2018, 2 pages.

marketsandmarkets.com, "Anti-Counterfeit Packaging Market by Technology (Coding & Printing, RFID, Hologram, Security labels, Packaging Design), Usage Feature (Track & Trace, Tamper Evidence, Overt, Covert, Forensic Markers), End-use Sector, and Region—Global Forecast to 2021," https://www.marketsandmarkets.com/Market-Reports/anti-counterfeit-packaging-advanced-technologies-and-global-market-129.html (retrieved May 2, 2018), 4 pages.

Morphotonix, "Morphotonix Product-embedded security," http://www.morphotonix.com/ (retrieved May 2, 2018), 2 pages.

Qin et al., "No Room for Error: RFID-enabled Smart Point-of-Care Medication Process in Hospital Wards," 2011 IEEE International Conference on RFID-Technologies and Applications (RFID-TA), IEEE, 2011, pp. 353-358.

Ahlund, "RFID in the BioPharmaceutical Supply Chain," BioPharm International, vol. 18, Issue 4, 2005, 3 pages.

Pearson, "Securing the Pharmaceutical Supply Chain with RFID and Public-key infrastructure (PKI) Technologies," Texas Instruments White Paper, 2005, 12 pages.

Wallstabe et al., "Implementing high-level Counterfeit Security using RFID and PKI," 2007 3rd European Workshop on RFID Systems and Technologies (RFID SysTech), VDE, 2007, 20 pages.

* cited by examiner

URL - ( http(s)://[address of network server 13]/[BoxID] )

$Enc(D_{prod})$ - ($D_{prod}$= ProdID, $D_{sec}$, Pass)

AUTHENTICATION OF PACKAGED PRODUCTS

BACKGROUND

The present invention relates generally to authentication of packaged products.

Introduction of fraudulent products is common in product distribution systems. Counterfeit or misrepresented goods can be injected at various points in a supply chain, and it is difficult for users to identify fraudulent products. A pertinent example is the pharmaceutical supply chain where injection of fraudulent products is of increasing concern to the World Health Organization. Techniques include imitating genuine product packaging for counterfeit products, altering critical product information, such as expiry dates, on packaging, and substituting products from one authentic packaging into another. As an illustrative example, medical test devices are common targets for fraud of this nature. In general, increasing profit margins continue to motivate fraud and counterfeiting, particularly for products that are easy to fabricate and/or widely used.

Current mechanisms for authentication of packaged products include printed information (e.g., text, logos, etc.), or security features such as holograms or QR codes on product labels or packaging. Various types of tamper-evident or hard-to-reproduce labels or similar security features have also been proposed. Some security mechanisms make use of computers for authentication. For example, QR codes can be scanned to present authentication information to a user, or a product code revealed by scratching a label can be sent to a server for authentication. Use of RFID (radio-frequency identification) tags on products is also known. Such tags can be programmed with unique identifiers (UIDs) which can be digitally signed, and the signatures verified by RFID readers.

Existing security mechanisms suffer from one or a combination of various disadvantages. For example, known mechanisms may be vulnerable to modification or reproduction to misrepresent products, may be impractical or unsuitable for particular products/user scenarios, or may have adverse complexity or cost implications, and can still leave products open to various types of fraud.

Improvements in mechanisms for authenticating packaged products would be highly desirable.

SUMMARY

According to at least one embodiment of the present invention there is provided a method for producing an authenticated packaged product. The method includes providing on the product a security code encoding security data for the product, packing the product in packaging, and providing a tag carrying encrypted product data on the packaging. The product data includes the security data for the product. The method further includes storing a decryption key for the encrypted product data at a network server, and providing on the packaging access data for accessing the decryption key at the network server.

Methods embodying the invention bind a product to its packaging via the security data which is encoded in the security code on the product and also encrypted in the product data carried by the tag on the packaging. A verifier can authenticate the product and its packaging by checking that the security data on the product matches that in the tag. Authentication thus relies on correct association of product and packaging, frustrating attempts to fraudulently repackage genuine products or copy genuine packaging for fraudulent products. Moreover, server involvement is required, providing the basis for additional security features described below, but the verification operation is performed locally at the verifier. In particular, there is no requirement to send the security data to the server. The server simply provides the decryption key and need have no knowledge of the security data on which authentication is based. Methods embodying the invention thus offer elegantly simple, practical and efficient techniques for secure authentication of packaged products.

The packaging may include more than one layer or level of packaging. For example, manufacturers may pack multiple individually-packaged products in a box or other container for shipment to a retailer or other end-user. In such embodiments, the overall packaging may include product packaging and a container, and the authentication method can include packing the product in the product packaging and providing the tag on the product packaging, and packing the product in the container with a plurality of other products, each having a respective security code thereon and each packed in respective product packaging having thereon a respective tag carrying encrypted product data which is decryptable using the same decryption key. The access data here includes a container identifier for the container and the product data includes a passphrase which is common to the product data of all products in the container. The authentication method further includes storing a hash of the passphrase with the decryption key at the network server for the container identifier. In these embodiments, all products in the container are additionally bound to that specific container via the passphrase which can be locally authenticated at the verifier. Moreover, the verifier can obtain the data for authentication of all products in the container via a single communication with the server. The received data can then be stored locally at the verifier for authenticating individual products.

Embodiments of the invention include storing descriptive data, relating to the product, with the decryption key at the network server. As well as a product description, the descriptive data can include all useful data relating to a product, such as expiry dates, instructions for use, sales region, and so on. This allows the verifier to obtain authentic descriptive data relating to the product, even if genuine packaging has been modified, e.g. to alter expiry dates, and also allows use of simple, cost-efficient tags, e.g. printed tags such as QR codes, which may have limited information storage capacity. Even if such a tag could feasibly be duplicated on fake packaging for a genuine product (e.g. where a fraudster switches one type of medical test device into packaging for a different test), this can be detected by the verifier.

In embodiments of the invention, the security code is embedded in the product, such that application of the security code is integrated in the manufacture of the product. For example, the security code may be provided on an internal part of the product, e.g. a test strip in a medical test device, or may be embedded in a surface of the product or otherwise integrated in the product itself. The security code may conveniently include a pattern of spots, as discussed in more detail below.

The product data can also include a unique product identifier for the product. This permits unique identification of particular product, even in implementations where the security data itself may not be unique, for example due to constraints on the code and/or space for provision of the code. This also provides basis for additional security operations involving the verifier/server as explained below.

For convenience, the access data may be carried by the tag in addition to the encrypted product data. In embodiments of the invention, the access data includes a URL (Uniform Resource Locator), allowing a verifier to access the data stored at the server simply using a web browser.

At least one further embodiment of the invention provides a method for verifying authenticity of a packaged product produced by a method as described above. The verification method is performed at a verifier computer having reader apparatus operatively associated therewith. The verification method includes reading, via the reader apparatus, the encrypted product data from the tag, and receiving said security code from the product and decoding the security code to obtain said security data for the product. The method further includes receiving the access data and communicating with the network server to obtain the decryption key, decrypting the encrypted product data using the decryption key to obtain decrypted security data, and verifying that the decrypted security data matches the security data for the product.

Where the product is packed in a container with other products, and authenticated via a method using a passphrase as described above, verification methods embodying the invention may include, at the verifier computer: receiving the access data and communicating with said network server to obtain the decryption key and the hash of the passphrase for the container identifier; reading, via the reader apparatus, the encrypted product data from the tag; and decrypting the encrypted product data using the decryption key to obtain a decrypted passphrase and decrypted security data. The method further includes: calculating a hash of the decrypted passphrase, and verifying that the calculated hash matches the hash obtained from the server; receiving the security code from the product and decoding the security code to obtain the security data for the product; and verifying that the decrypted security data matches the security data for the product. The method can also include storing the decryption key and the hash obtained from the server for verifying authenticity of other products in the container.

Where the product data includes a unique product identifier for the product, the verification method can include, after decrypting the encrypted product data to obtain a decrypted product identifier, calculating a hash of the decrypted product identifier and sending the hash to the network server for storage at the server of use data, including said hash, with the decryption key. This permits product tracking, and also allows previous-use checks to be performed for products. In particular, verification methods may include receiving from the server with the decryption key any use data stored with that key, and checking whether said hash of the decrypted product identifier matches a hash in the use data. This provides an additional fraud indicator as discussed further below.

At least one additional embodiment of the invention provides a system for verifying authenticity of a packaged product produced by a method as described above. The system includes a server storing the decryption key, and a verifier computer, having reader apparatus operatively associated therewith, operable for communication with the server via a network. The verifier computer is adapted to read, via the reader apparatus, the encrypted product data from the tag, to receive the security code from the product and to decode the security code to obtain the security data for the product, to receive the access data and to use the access data to send an access request for the decryption key to the server via the network. The server is adapted, in response to the access request, to send the decryption key to the verifier computer via the network. The verifier computer is further adapted to decrypt the encrypted product data using the decryption key to obtain decrypted security data, and to verify that the decrypted security data matches the security data for the product.

Still further embodiments of the invention provide a packaged product having: a security code on the product, the security code encoding security data for the product; a tag carrying encrypted product data on the packaging, the product data including the security data; and access data, for accessing a decryption key for the encrypted product data at a network server storing the decryption key, on the packaging.

In general, where features are described herein with reference to an authentication method embodying the invention, corresponding features may be provided in a verification method/system or a packaged product embodying the invention, and vice versa.

Embodiments of the invention will be described in more detail below, by way of illustrative and non-limiting example, with reference to the accompanying drawings.

DETAILED DESCRIPTION

Figure 1:
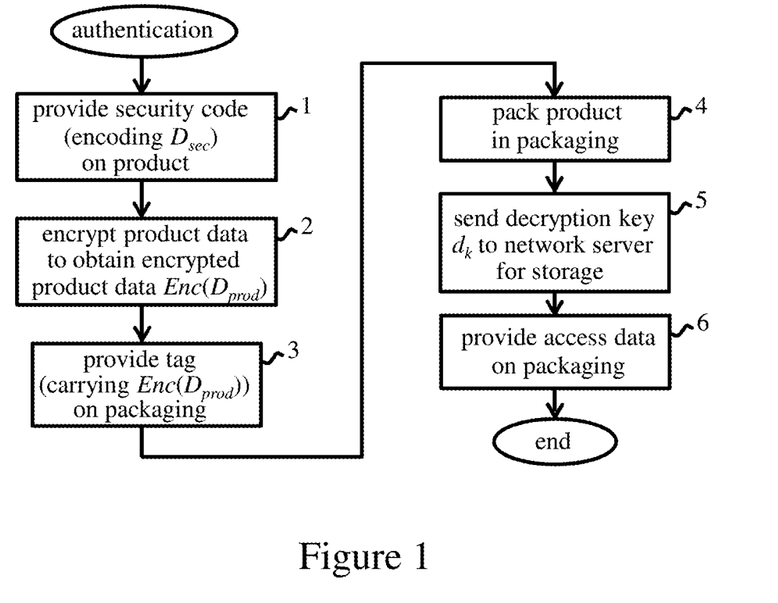
FIG. 1 indicates steps of a method for producing an authenticated packaged product embodying the invention.

FIG. 1 indicates basic steps of a method for producing an authenticated packaged product embodying the invention. Steps of this method may be performed by a product manufacturer during manufacture of the product/packaging. In step 1, the manufacturer provides a security code on the product. This security code encodes security data, denoted here by Dsec and described further below, for the product. In step 2, the manufacturer encrypts product data, denoted here by Dprod, via an encryption algorithm Enc to obtain encrypted product data Enc (Dprod). The product data Dprod includes the security data Dsec for the product, and may include various additional data discussed below. The encryption is performed using an encryption key ek of a key pair (ek, dk) of an encryption scheme. Such encryption schemes are well known in the art, and define an encryption algorithm Enc and a decryption algorithm Dec, such that data encrypted under key ek via the encryption algorithm Enc can be decrypted using the corresponding decryption key dk and the decryption algorithm Dec. The encryption key ek is secret to the manufacturer here. In step 3, the manufacturer provides a tag, carrying the encrypted product data Enc (Dprod), on packaging for the product, and the product is packed in the packaging in step 4. In step 5, the manufacturer stores the decryption key dk at a network server. This server can be accessed via a network by verifiers needing subsequently to verify authenticity of the product. In step 6, the manufacturer provides access data for accessing the decryption key at the network server on the packaging. The access data, denoted by Dacc, may take various forms as discussed below, but allows the correct decryption key dk to be retrieved by the server for provision to a verifier. The authentication process is then complete, and the product can be sent to a recipient via a distribution system.

The steps of FIG. 1 may be performed in any convenient order and certain steps may be combined as appropriate. Particular steps, e.g. steps 2 and 5, may be performed by a (general- or special-purpose) computer of the manufacturer as part of an automated production process.

The security data Dsec may include a value, value-string, alphanumeric string or other data allocated to, and thus associated with, the particular product. The security data thus differs for different products, and may be unique to a product, e.g. a unique product serial number, where appropriate. The security code can encode the security data in any convenient manner, and may be provided in various ways on the product. In some embodiments, the security code may include a human-readable string of numbers and/or letters. Conveniently, the security code is provided as a code pattern, such as a pattern of spots (which may be shaped as dots, lines and/or other shapes/symbols), the arrangement, shape, size, color or other presentation of which encodes the security data. In embodiments of the invention, the security code is embedded in the product for additional security, and such code patterns can be readily integrated in product manufacture, e.g. via printing, stamping, etching, engraving, embossing, moulding or lithography, or by otherwise patterning a surface or part of the product with the code. In general, however, the security code may be presented in any convenient manner e.g. in a tamper-evident sticker, barcode, magnetic strip or other storage mechanism, as appropriate for a given product. The tag on the packaging may similarly take a variety of forms and may carry the encrypted product data in various ways. Examples include printed tags including code patterns such as QR codes, barcodes, or other optically or otherwise machine-readable printed codes, optical devices such as holograms, and magnetic strips or other convenient data storage media. Memory devices such as RFID or NFC (near field communication) tags might also be used. However, embodiments described herein can offer high security in the authentication system without use of such secure memory devices. Embodiments of the invention can exploit simple printed tags such as QR codes.

The packaging may in general include one or more levels or layers of packaging. A packaging layer may include a wrapper, bag, box, sleeve, package, case, or other container for a product, and may also include stickers, labels, leaflets, etc.

The product data Dprod which is encrypted in the tag may include various additional data items. For instance, where the security data for a product is not unique, e.g. due to coding constraints and/or limited space on the product for the code, the product data ideally includes a unique product identifier prodID. This allows unique identification of the product, and may be used in additional security operations detailed below.

The access data Dacc may be provided on the packaging separately of the tag, but is conveniently carried by the tag in addition to the encrypted product data. The access data typically includes some form of identifier to enable the correct decryption key dk to be identified in storage at the server, and may indicate the network address of the server. In embodiments of the invention, the access data includes a URL via which the decryption key can be retrieved. The URL thus conveniently presents the network address for accessing the server, and can include an identifier (e.g. a product identifier, or a container identifier discussed below) in the path of the URL to identify the particular decryption key for the product. Such an identifier, as well as additional data discussed below, may be provided to the server in step 5 of FIG. 1.

Figure 2:
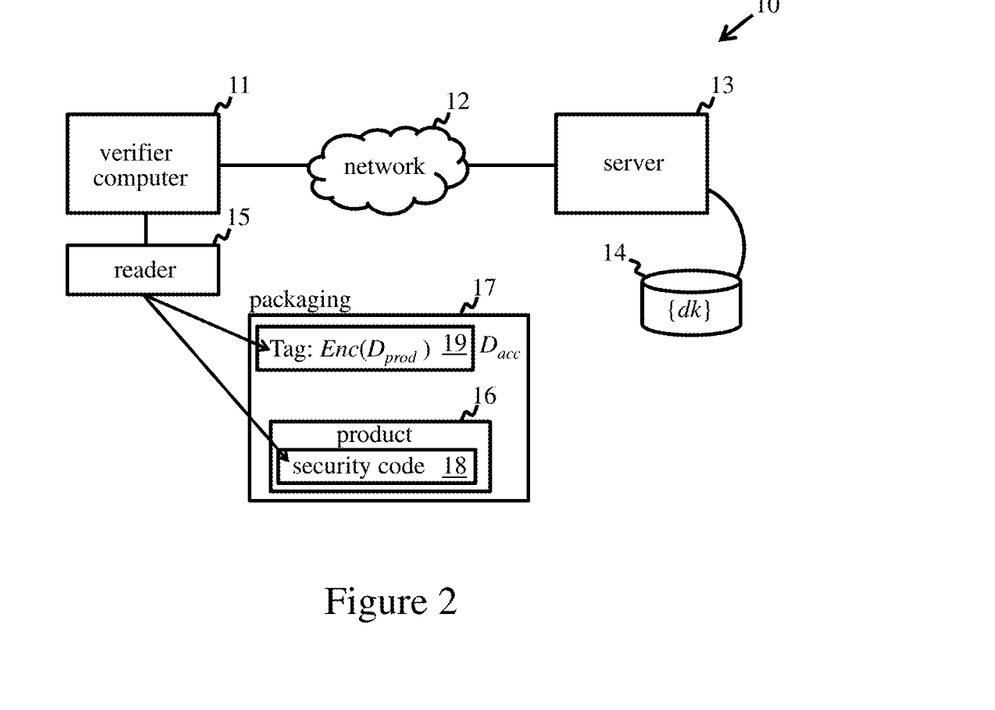
FIG. 2 is a schematic representation of a verification system embodying the invention.

FIG. 2 is schematic block diagram of a verification system for verifying authenticity of packaged products produced by the method of FIG. 1. The verification system is used by recipients of products authenticated by a manufacturer in accordance with FIG. 1 and transported to recipients via a distribution system. The verification system 10 includes a verifier computer 11 which is operable for communication via a network 12 with a server 13 at which decryption keys dk are stored by the product manufacturer as described above. The set of decryption keys {dk} for products are held in storage, represented here by database 14, operatively associated with server 13. Each key dk is stored in association with an identifier for that key, e.g. an identifier for the storage location of the key provided in a URL path as described above. The verifier computer has reader apparatus 15 operatively associated therewith. The reader apparatus 15 is adapted for reading data from a packaged product, including a product 16 and packaging 17, produced by the method of FIG. 1. In particular, the reader apparatus of this embodiment is operable for reading the security code 18 (including security data Dsec) from the product 16, and also for reading the tag 19, carrying encrypted product data Enc (Dprod), from packaging 17. (In other embodiments, the security code may be provided in human-readable form whereby the code can be read by a user and input to verifier computer 11 via a user interface of the verifier computer). Where the access data Dacc is provided on packaging 17 separately of the tag, reader apparatus 15 may be further operable to read Dacc from packaging 17.

Verifier computer 11 may be implemented by a general or special-purpose computer which is operated by a party wishing to authenticate the product 16. For example, verifier computer may be implemented by a general-purpose user computer such as a mobile phone, tablet computer, desktop computer, laptop computer, notebook, palmtop, PDA (personal digital assistant), or other user computer device. Alternatively, verifier computer 11 may be implemented by a dedicated hand-held unit in some scenarios. Reader apparatus 15 may be integrated with verifier computer 11 (e.g. an integrated camera of a mobile phone or tablet computer) or may be coupled to verifier computer 11 (via a wired or wireless link) in any convenient manner. Reader apparatus 15 may in general include one or more reader devices, and various implementations can be envisaged according to the particular manner in which data is provided on the packaged product. For example, reader apparatus 15 may include one (or a combination of) a camera, scanner, magnetic strip reader, RFID or NFC reader, barcode reader, or other sensor adapted to capture an image, scan, sense or otherwise "read" the security code 18 and the tag 19 so that data presented thereby is provided to verifier computer 11. The reader apparatus 15 and/or verifier computer 11 may include logic providing functionality for decoding the security code 18, e.g. from an image thereof captured by a camera, to extract the security data according to the particular manner of representation. For tags embodying code patterns such as QR codes etc., the reader apparatus and/or verifier computer may similarly include logic providing functionality for extracting the data represented thereby. Verifier computer 11 further includes logic providing functionality for implementing steps of the verification process detailed below.

In general, network 12 may include one or more component networks and/or internetworks, including the Internet, and each of verifier computer 11 and server 13 may be implemented by a computer including one or more (real or virtual) machines providing functionality for implementing the operations described. Particular functionality of these computers may be provided by logic implemented in hardware or software or a combination thereof. The logic may be described in the general context of computer system-executable instructions, such as program modules, executed by a computing apparatus. Generally, program modules may include routines, programs, objects, components, logic, data structures, and so on that perform particular tasks or implement particular abstract data types. The computing apparatus may be practiced in distributed cloud computing environments where tasks are performed by remote processing devices that are linked through a communications network. In a distributed cloud computing environment, data and program modules may be located in both local and remote computer system storage media including memory storage devices.

Figure 3:
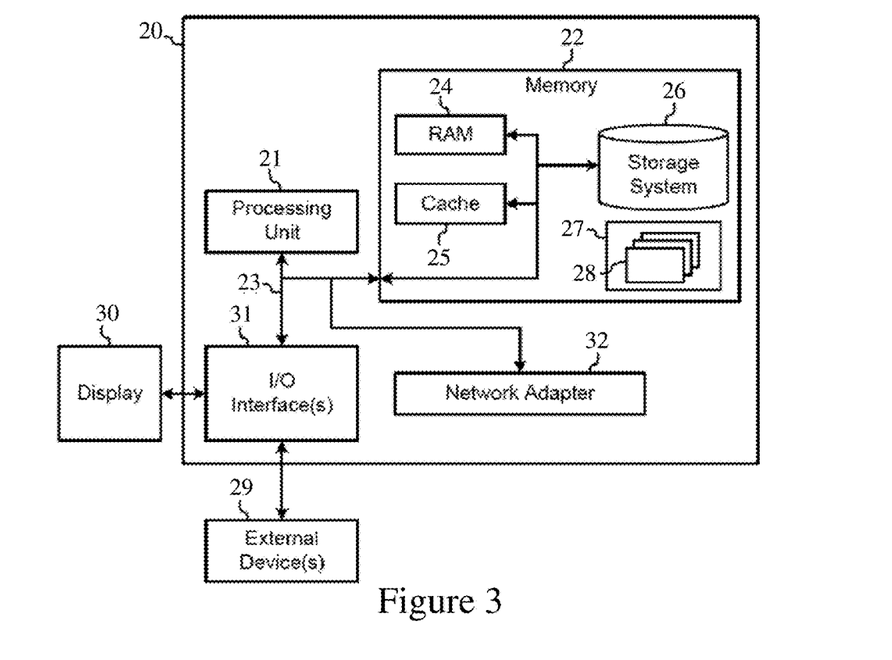
FIG. 3 is a generalized schematic of a computer in the FIG. 2 system.

FIG. 3 is a block diagram of exemplary computing apparatus for implementing a computer of the above system. The computing apparatus is shown in the form of a general-purpose computer 20. The components of computer 20 may include processing apparatus such as one or more processors represented by processing unit 21, a system memory 22, and a bus 23 that couples various system components including system memory 22 to processing unit 21.

Bus 23 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 20 typically includes a variety of computer readable media. Such media may be any available media that is accessible by computer 20 including volatile and non-volatile media, and removable and non-removable media. For example, system memory 22 can include computer readable media in the form of volatile memory, such as random access memory (RAM) 24 and/or cache memory 25. Computer 20 may further include other removable/non-removable, volatile/non-volatile computer system storage media. By way of example only, storage system 26 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 23 by one or more data media interfaces.

Memory 22 may include at least one program product having one or more program modules that are configured to carry out functions of embodiments of the invention. By way of example, program/utility 27, having a set (at least one) of program modules 28, may be stored in memory 22, as well as an operating system, one or more application programs, other program modules, and program data. Each of the operating system, one or more application programs, other program modules, and program data, or some combination thereof, may include an implementation of a networking environment. Program modules 28 generally carry out the functions and/or methodologies of embodiments of the invention as described herein.

Computer 20 may also communicate with: one or more external devices 29 such as a keyboard, a pointing device, a display 30, etc.; one or more devices that enable a user to interact with computer 20; and/or any devices (e.g., network card, modem, etc.) that enable computer 20 to communicate with one or more other computing devices. Such communication can occur via Input/Output (I/O) interfaces 31. Also, computer 20 can communicate with one or more networks such as a local area network (LAN), a general wide area network (WAN), and/or a public network (e.g., the Internet) via network adapter 32. As depicted, network adapter 32 communicates with the other components of computer 20 via bus 23. It should be understood that although not shown, other hardware and/or software components could be used in conjunction with computer 20. Examples include, but are not limited to: microcode, device drivers, redundant processing units, external disk drive arrays, RAID systems, tape drives, and data archival storage systems, etc.

Figure 4:
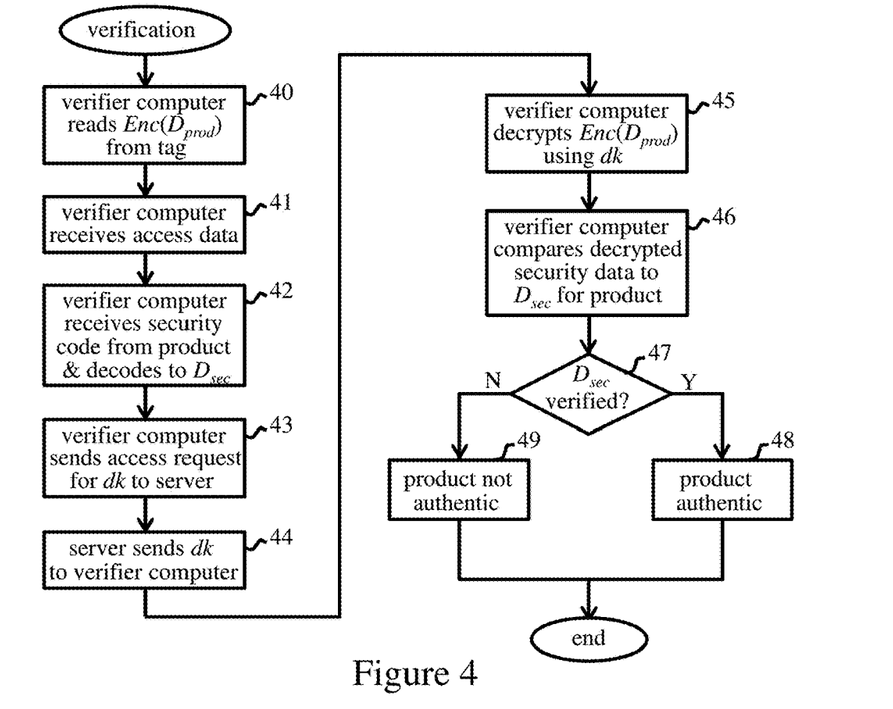
FIG. 4 indicates steps of a verification method performed by the FIG. 2 system.

FIG. 4 indicates basic steps of the verification method performed by system 10. (The steps of this figure may be performed in any convenient order, and steps may be combined as appropriate). In step 40, verifier computer 11 reads the encrypted product data Enc (Dprod) from tag 19 via reader apparatus 15. In step 41, verifier computer 11 receives the access data Dacc. (This data may be obtained by reading the tag in step 41, or read separately from the packaging via reader apparatus 15, or read by a user and provided via user input to computer 11, depending on how the access data is provided on the packaging). In step 42, verifier computer 11 receives the security code 18 from the product 16, e.g. via reader apparatus 15, and decodes the security code to obtain the security data Dsec. In step 43, verifier computer 11 uses the access data Dacc to send an access request for the decryption key dk to server 13 via network 12. This step can be implemented in various ways. For example, verifier computer may be programmed with a dedicated application for communicating with server 13 at a predetermined network address, and the access data may simply include an identifier for retrieving the correct key from the server. In embodiments of the invention, however, the access data includes a URL containing a path to the key, whereby verifier computer 11 can obtain the correct key from the server by accessing the URL. In step 44, in response to the access request, server 13 sends the decryption key dk to verifier computer 11 via network 12, e.g. via a web-page accessed via the URL. Verifier computer 11 thus obtains the correct decryption key dk, and uses this key in step 45 to decrypt the encrypted product data Enc (Dprod) to obtain the decrypted security data in the product data Dprod. In step 46, verifier computer 11 compares this decrypted security data to the security data Dsec obtained in step 42. If the decrypted security data matches Dsec for the product (as indicated by decision "Yes" (Y) at decision block 47), then the verifier computer deems the product authentic in step 48 and can display an appropriate message to the user. If the security data Dsec is not verified ("No" (N) at decision 47), then verifier computer 11 deems that the product is not authentic in step 49, and a warning message is displayed to the user.

The techniques described above allow a user to authenticate a packaged product based on the security data via which the product is bound to its packaging at the manufacturer. The security data is encoded on the product and encrypted in the tag for security, and remains local to the verifier for the verification operation. The server does not receive, and has no knowledge of, the security data itself, frustrating attempts to undermine the authentication process via sniffing attacks on communications with the server or hacking/fetching of data stored at the server.

Figure 5:
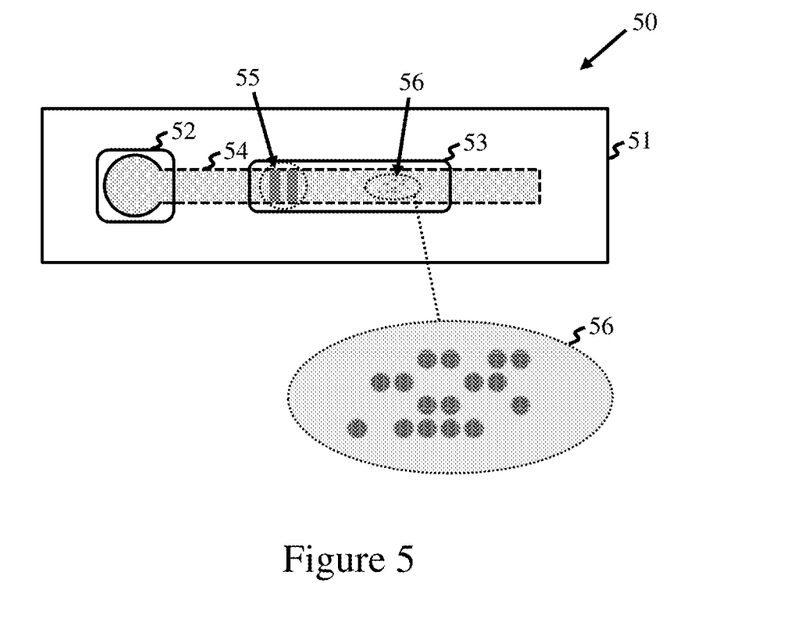
FIG. 5 is a schematic representation of a medical test device embodying the invention.

Embodiments of the authentication system will be described in detail below for a scenario in which the product 16 is a medical test device. FIG. 5 shows an exemplary embodiment of a medical test device 50 of a type, in common use in the health-care industry, which is operable by application of a fluid sample (e.g. blood or urine) to the test device. Such diagnostic tests are commonly used to test for a wide variety of medical conditions. In the example shown, the test device 50 has a casing 51 having a test window 52 and a display window 53 therein. Test window 52 contains a diluent well to which the test fluid is applied in use. The diluent well typically contains one or more chemicals which dissolve in the test fluid and are conveyed by the fluid (e.g. via an absorbent test strip or microchannels in the device, indicated schematically at 54) towards the display window 53. One or more further chemicals may be contained within display window 53 to provide a chemical reaction if the test result is positive, resulting in a visual indication of the test result as indicated schematically at 55. The display window also contains a region for displaying the security code 56 for the product. The security code 56 can be provided on the test in a form which is (at least partially) hidden until the test is used. In particular, the test fluid is conveyed along the test device and reacts with one or more chemicals to reveal (or fully reveal) the security code 56. The security code 56 is embedded in the test device as a pattern of spots, here chemical spots which can be printed on the test strip during manufacture, such that the spot pattern is revealed when the test is used. As indicated in the enlargement, the security code here includes spots arranged in a 4-by-8 grid. Each spot represents one bit of the code, whereby the spot array defines a 32-bit code.

Figure 6:
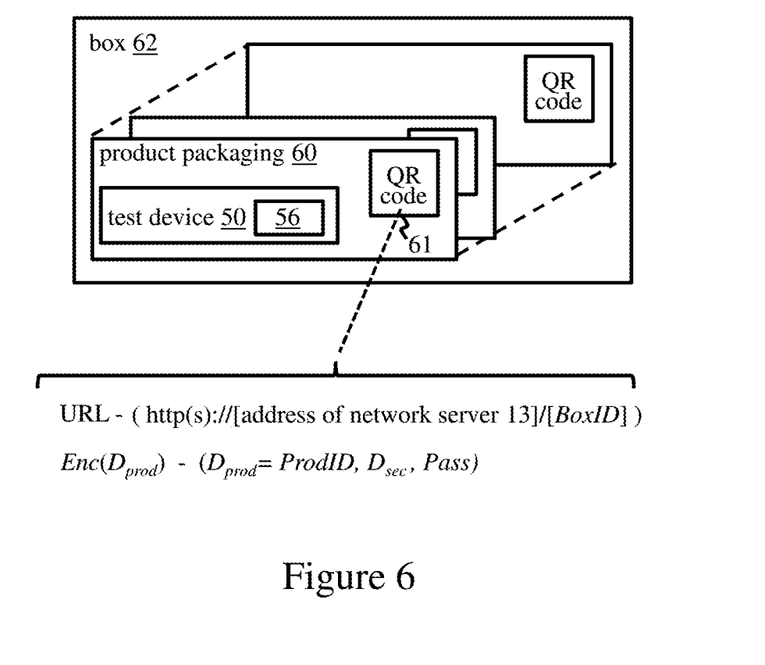
FIG. 6 illustrates packaging of authenticated medical test devices in accordance with embodiments of the invention.

Such test devices 50 are typically packaged and sold in multi-packs containing a plurality of individually-packaged tests. FIG. 6 is a schematic illustration of the packaging in this embodiment. Each test 50, with respective embedded security code 56, is packed in individual product packaging 60. Product packaging 60 has a printed tag 61, here a QR code, thereon. The packaged tests 50 are then packed in a container, here a box 62, having a unique box identifier BoxID allocated by the manufacturer.

The QR code 61 on each packaged test carries access data Dacc including a URL of the form http(s)://[address of network server 13]/[BoxID]. In addition, each tag 61 carries the encrypted product data Enc (Dprod) for the corresponding test. The product data Dprod contains: a unique product identifier ProdID for that test; the security data Dsec encoded in security code 56 of that test, and a passphrase Pass which is common to the product data of all tests in box 62 with identifier BoxID. The passphrase Pass may in general include a single password or a string of passwords.

Figure 7:
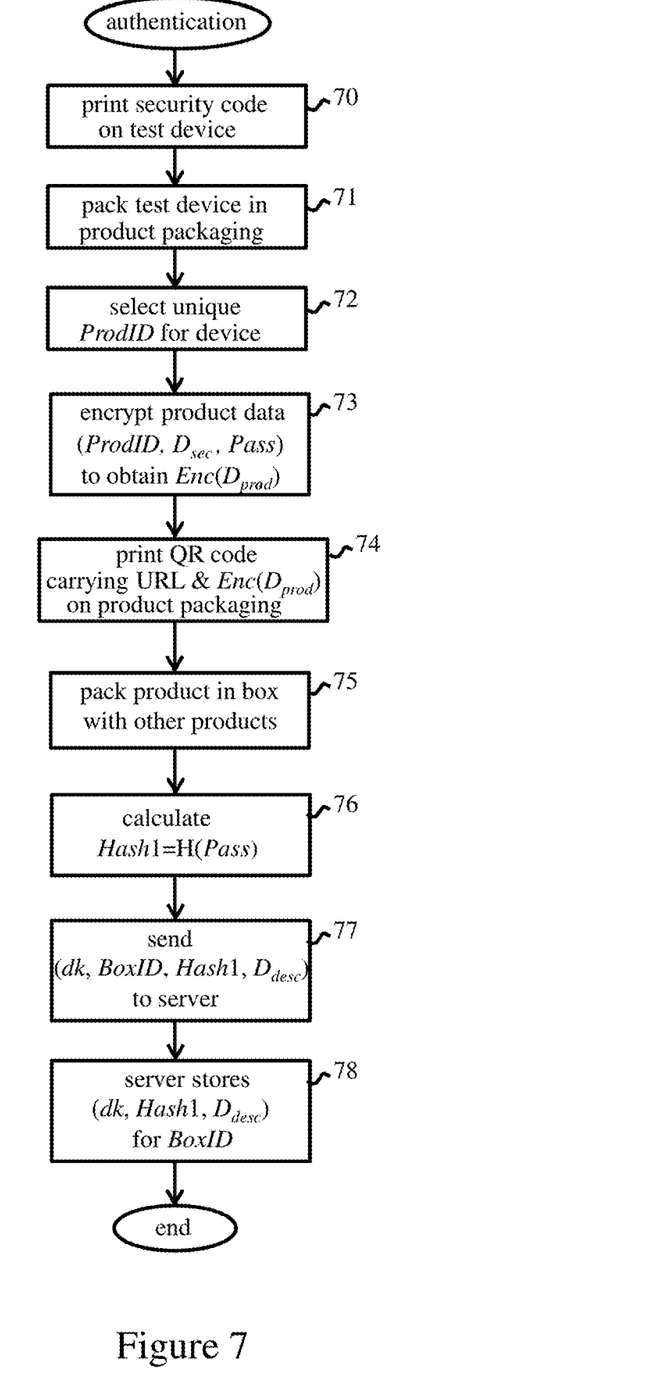
FIG. 7 indicates steps of a method for producing the authenticated devices of FIG. 6 according to embodiments of the invention.

FIG. 7 indicates steps of the authentication method performed the manufacturer in this embodiment. In step 70, the manufacturer prints the security code 56, encoding security data Dsec, on a test device 50. In step 71, the device is packed in product packaging 60. In step 72, the manufacturer selects the unique product identifier ProdID for the test. In step 73, the manufacturer uses an encryption key ek to encrypt the product data Dprod, including ProdID, Dsec and the passphrase Pass for the box BoxID in which the test is to be packed, to obtain the encrypted product data Enc (Dprod). In step 74, the manufacture prints a QR code 61, containing Enc (Dprod) and the access data Dacc=http(s)://[address of network server 13]/[BoxID] on the test packaging 60. Steps 70 to 74 are performed for all products to be packed in box BoxID, and the same encryption key ek is used in step 73 for each of these products. The products are packed in the box 62 in step 75. In step 76, the manufacturer calculates a hash value Hash1=H(Pass) by applying a hash algorithm H to the passphrase Pass for the box. In step 77, the manufacturer sends the decryption key dk corresponding to ek to network server 13, along with BoxID, the hashed passphrase Hash1, and descriptive data Ddesc relating to the products in the box. The descriptive data Ddesc includes a product description and expiry date for devices 50, and may include instructions for use, sales region, and any other useful data relating to a product which it may not be feasible to include in the encrypted product data on the tag. Communication with the server can be conducted over a secure channel, e.g. using standard security protocols such as SSL/TLS (Secure Sockets Layer/Transport Security Layer), and privileged access may be required for manufacturers, e.g., using standard identity management mechanisms at server 13. In step 78, server 13 then stores the key dk, along with Hash1 and the descriptive data Ddesc, at a storage location accessible via the URL http(s)://[address of network server 13]/[BoxID]. This completes the authentication process for the manufacturer.

Figure 8:
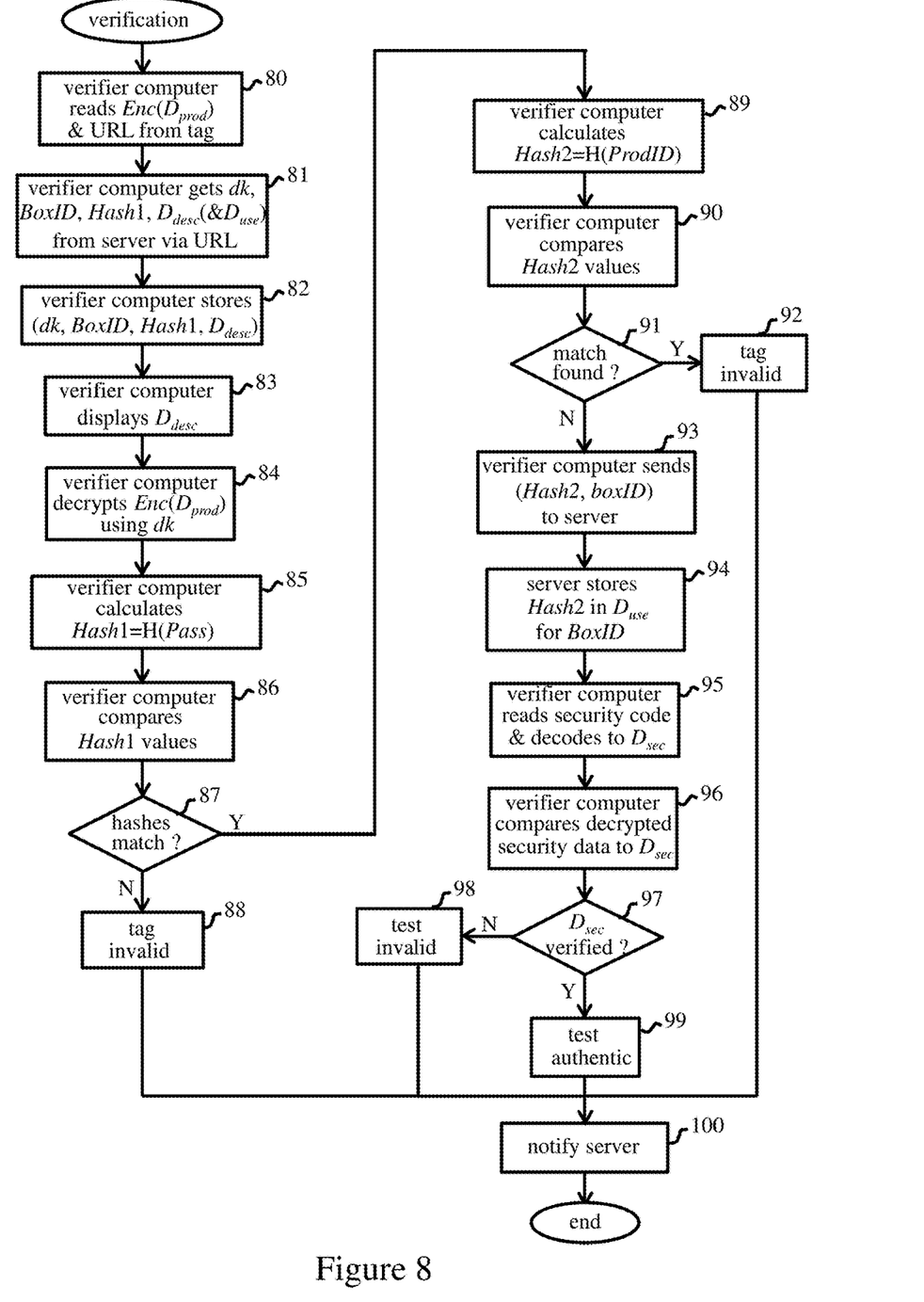
FIG. 8 indicates steps of a verification method performed by the FIG. 2 system in accordance with embodiments of the invention.

FIG. 8 indicates steps performed by verification system 10 in this embodiment. Verifier computer 11 is conveniently implemented by a mobile phone or tablet computer operated by a party wishing to use a test device 50 which is received in a box 62 of such tests. In step 80, the user scans the QR code 61 on a selected test package, whereby verifier computer 11 reads the encrypted product data Enc (Dprod) and the URL from the QR code. In step 81, the user accesses the URL http(s)://[address of network server 13]/[BoxID] whereby verifier computer 11 obtains the decryption key dk, with the hashed-passphrase Hash1 and descriptive data Ddesc for test devices. The verifier computer may also receive any use data, denoted by Duse, stored by server 13 for products in the box pursuant to steps described below. Such use data may include one or more hash values Hash2=H(ProdID) corresponding to previously validated products as detailed below. The communication step 81 can be conducted over a secure channel established with server 13 using SSL/TLS.

In step 82, the verifier computer stores the received data in local storage for verifying authenticity of all products in the box. In step 83, the verifier computer displays the descriptive data Ddesc to the user for checking against the received products. Next, in step 84, the verifier computer uses the key dk to decrypt the encrypted product data Enc(Dprod), obtained in step 80 for the selected test, to obtain the decrypted product data Dprod containing ProdID, Dsec and the passphrase Pass. In step 85, verifier computer 11 calculates a hash value Hash1=H(Pass) from the decrypted passphrase Pass. In step 86, the verifier computer compares the resulting hash value with the hashed passphrase received from the server in step 81. If the passphrase hashes do not match ("No" at decision 87), the verifier computer deems the tag invalid in step 88. A warning message may then be displayed to the user, and in step 100 the verifier computer can notify server 13 that authentication has failed due to an invalid tag passphrase in box BoxID. If the passphrase hashes match ("Yes" at decision 87), operation proceeds to step 89.

In step 89, verifier computer 11 calculates a hash value Hash2=H(ProdID) from the decrypted product identifier ProdID. In step 90, the verifier computer compares the resulting hash value Hash2 with any use data Duse received in step 81. If a matching hash value is found ("Yes" at decision 91) then ProdID matches a product identifier in the use data, corresponding to a previously authenticated product. In this event, the verifier computer deems the tag invalid in step 92 and displays a warning message to the user. The verifier computer can then alert the server in step 100 that authentication failed due to a previously-authenticated ProdID in a tag for box BoxID. Assuming no matching Hash2 value is found ("No" at decision 91), then in step 93 the verifier computer sends the hash value Hash2 to server 13 along with the box identifier BoxID. Hash values received in this step can be used for product tracking purposes at server 13 while protecting the product identifier ProdID. In step 94, the server then stores the hash value Hash2 in the use data Duse for box BoxID. A duplicated tag will thus be detected at step 91 of a subsequent verification procedure.

Having validated the QR code, the user is then free to open and use the test device. Next, in step 95, the user photographs the security code 56 on the test and the verifier computer 11 reads the security code and decodes the security data Dsec from the image. In step 96, the verifier computer compares the resulting security data Dsec to the decrypted security data obtained in step 84. If this data does not match at decision 97 then the test is not authenticated and a warning message can be displayed at step 98. The verifier computer can also alert the server in step 100 that authentication failed due to invalid security data. Assuming the security data is valid, the test is authenticated at step 99 and a message is displayed accordingly. Then, in step 100, the verifier computer can notify server 13 that the test was fully authenticated after use, and the verification process is complete.

The above procedures offer secure, practical and low-cost authentication system for products such as medical test devices. Products are bound to the box via the passphrase, and each product is bound to its packaging via the security data. Simple security codes can be used on products, and additional data can be stored by the tag/server for product validation. The user can authenticate all products in the box based on the information returned by the server in step 81 for the first product. This reduces the need for network connectivity and is particularly useful in situations, e.g. for medical services in remote locations, where connectivity is intermittent. Product validation can be performed via a web browser using a phone or similar computing device. Moreover, test devices are not used until tags have been validated, inhibiting wastage of test samples on fraudulent tests. The use data stored at step 94 allows product tracking and detection of duplicated tags. Authentication failure notifications provided to server 13 in step 100 of FIG. 8 supplement the information provided to the server about product validation, and may be used to store potential fraud alerts for the box boxID as a whole. Such fraud alerts can be supplied to a verifier attempting to verify any product in the box boxID, providing fraud alerts at the container level. This information can also help to distinguish different types of fraud, such as products being duplicated after use or tags being duplicated (e.g. on fake packaging) for otherwise genuine products.

Many changes and modifications can of course be made to the exemplary embodiments described. For example, if no network connectivity is available for steps 93 or 100 of FIG. 8, these steps can be performed when connectivity is next restored. Server 13 may provide privileged access to verifiers via a local network in some scenarios. Server 13 might also be used to store tracking information which is supplied by other entities, such as distributors, freight operators, etc., in a distribution system. Such entities may scan a product tag or read access data Dacc otherwise provided on a box and notify the server of the distribution status of a box BoxID.

The basic techniques described are versatile and scalable and can be applied to numerous products, not only other pharmaceutical/diagnostic/medical products but also products, such as clothing or automotive, aeronautics or other engineering parts for example, in other industries which are targets for fraud.

Numerous other examples for security codes and techniques for encoding security data can be envisaged. For instance, optical codes may be based on color coding, e.g. on relative proportions of differently colored dyes in a code region of a product, such as a clothing label. Such a code may be decoded by analyzing the color spectrum in an image captured by a camera for example. Other optical codes may be based on materials with optical properties other than color, e.g. fluorescence. Codes may also be based on other properties of materials e.g. inks or other chemicals with different electrical or magnetic properties which can be detected by electromagnetic analysis, e.g. by analyzing resonant frequencies, in a code reader. In general, code patterns may include one or more materials with various properties which can be detected for the reading the code, and coding techniques can be selected as appropriate for any particular product.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for producing an authenticated packaged product, the method comprising:
   providing on the product a security code encoding security data for the product;
   packing the product in packaging;
   providing a tag carrying encrypted product data on the packaging, the product data comprising the security data;
   storing a decryption key for the encrypted product data at a network server;

providing on the packaging access data for accessing the decryption key at the network server;

reading, using a verifier computer having reader apparatus operatively associated therewith, the encrypted product data from the tag, wherein the product data includes a unique product identifier for the product;

receiving the security code from the product and decoding the security code to obtain the security data for the product;

receiving the access data and communicating with the network server to obtain the decryption key;

decrypting the encrypted product data using the decryption key to obtain decrypted security data;

calculating a hash of the decrypted product identifier and sending the hash to the network server for storage at the server of use data, comprising the hash with the decryption key;

receiving from the server with the decryption key any use data stored with that key;

checking whether the hash of the decrypted product identifier matches a hash in the use data; and verifying that the decrypted security data matches the security data for the product.

2. A method as claimed in claim 1 including storing descriptive data, relating to the product, with said decryption key at the network server.

3. A method as claimed in claim 2 wherein the tag comprises a printed tag.

4. A method as claimed in claim 1 wherein the security code is embedded in the product.

5. A method as claimed in claim 4 wherein the security code comprises a pattern of spots.

6. A method as claimed in claim 5 wherein the product comprises a medical test device.

7. A method as claimed in claim 1 wherein the product data includes a unique product identifier for the product.

8. A method as claimed in claim 1 wherein said packaging comprises product packaging and a container, the method further including:

packing the product in the product packaging and providing the tag on the product packaging; and packing the product in the container with a plurality of other products, each having a respective said security code thereon and each packed in respective product packaging having thereon a respective said tag carrying encrypted product data which is decryptable using said decryption key;

wherein said access data comprises a container identifier for said container and said product data includes a passphrase which is common to the product data of all products in the container, and wherein the method further comprises storing a hash of the passphrase with said decryption key at the network server for said container identifier.

9. The method of claim 8 further comprising using a verifier computer having reader apparatus operatively associated therewith to:

receive said access data and communicating with said network server to obtain said decryption key and said hash of the passphrase for said container identifier;

read, via said reader apparatus, said encrypted product data from the tag;

decrypt the encrypted product data using the decryption key to obtain a decrypted passphrase and decrypted security data;

calculate a hash of the decrypted passphrase, and verifying that the calculated hash matches the hash obtained from the server;

receive said security code from the product and decoding the security code to obtain said security data for the product; and verify that the decrypted security data matches said security data for the product.

10. A method as claimed in claim 9 including storing the decryption key and said hash of the passphrase obtained from the server for verifying authenticity of other said products in the container.

11. A method as claimed in claim 9 wherein descriptive data, relating to the product, is stored with the decryption key at the network server, the method including receiving the descriptive data from the network server with the decryption key, and displaying the descriptive data to a user.

12. A method as claimed in claim 1 wherein said access data comprises a URL.

13. A method as claimed in claim 1 wherein said access data is carried by the tag.

14. A method as claimed in claim 1 wherein descriptive data, relating to the product, is stored with the decryption key at the network server, the method including receiving the descriptive data from the network server with the decryption key, and displaying the descriptive data to a user.

15. A system for verifying authenticity of a packaged product, the system comprising a server storing a decryption key, and a verifier computer, having reader apparatus operatively associated therewith, are operable for communication with the server via a network, wherein:

the packaged product comprises:

a security code on the product and encoding security data for the product;

a packaging;

a tag carrying encrypted product data on the packaging, the product data comprising the security data;

a decryption key for the encrypted product data stored at a network server; and access data on the packaging for accessing the decryption key at the network server:

the verifier computer is adapted to read, via the reader apparatus, the encrypted product data from the tag, wherein the product data includes a unique product identifier for the product, to receive the security code from the product and decode the security code to obtain the security data for the product, and to receive the access data and use the access data to send an access request for the decryption key to the server via the network;

the server is adapted, in response to the access request, to send the decryption key to the verifier computer via the network; and the verifier computer is further adapted to decrypt the encrypted product data using the decryption key to obtain decrypted security data, to calculate a hash of the decrypted product identifier and to send the hash to the network server for storage at the server of use data, comprising the hash with the decryption key, to receive from the server with the decryption key any use data stored with that key, to check whether the hash of the decrypted product identifier matches a hash in the use data; and to verify that the decrypted security data matches the security data for the product.

* * * * *